United States Patent Office 3,350,940
Patented Nov. 7, 1967

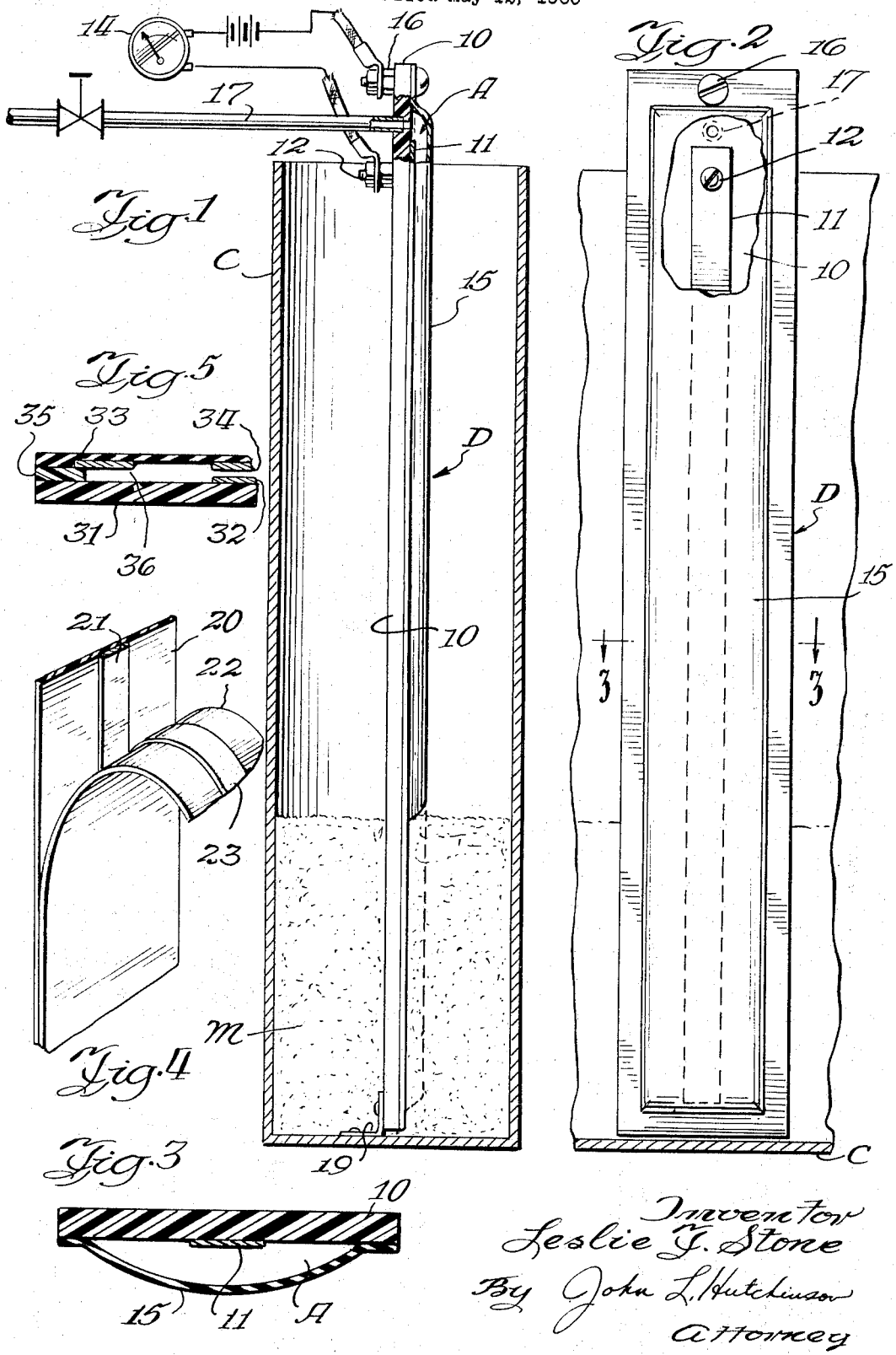

3,350,940
LEVEL MEASURING DEVICE
Leslie F. Stone, Bellwood, Ill. (% The Richardson Co., Melrose Park, Ill. 60160)
Filed May 12, 1965, Ser. No. 455,176
2 Claims. (Cl. 73—301)

The present invention is concerned with a new and improved measuring device.

Various types of measuring devices have been developed for determining the height and, correspondingly, the volume of liquids in a container. However, many of these devices are not suitable for or adaptable to the measurement of solid particle materials.

Accordingly, it is a primary object of this invention to provide a measuring device which may be used to measure the height of finely divided, pulverized or granular solid materials disposed within a container.

Another object is to provide a measuring device of the foregoing type which is mechanically simple in operation and may be economically manufactured.

These and other objects will become more apparent from the following detailed description and the drawing.

In the drawing:

FIGURE 1 is a side elevational view, partly in section, of one form of measuring device demonstrating its use.

FIGURE 2 is a front elevational view, partly broken away, of the same form of measuring device.

FIGURE 3 is a cross sectional view taken on the line 3—3 of FIGURE 2.

FIGURE 4 is a partial perspective view of another form of measuring device.

FIGURE 5 is a cross sectional view of a further type of measuring device.

Broadly, the measuring device of this invention comprises a substantially rigid back or support member and a second flexible member or covering secured to the support member, generally along the edges or periphery thereof, the latter being normally maintained in spaced relationship with respect to the support member. In a presently preferred embodiment, the back or support member has secured thereto an electrically conductive strip of substantially the same length. The flexible member is composed of an electrically resistive material or, alternately, is provided with an electrically resistive film which will permit limited flow of current. When the device is inserted into a container of solid particulate material, the flexible member is collapsed and forced against the support due to the pressure of the particulate material and, by reason of the resulting contact between the current carrying means of the two members, an electrical circuit is completed and current is permitted to flow. The amount of current is proportional to the length of contact between the two members and is registered on a meter to indicate the extent to which the flexible member has been collapsed and, hence, the height of the material in the container.

As indicated, the flexible member itself may be made of an electrical resistive material permitting limited flow of current or, alternately, may have attached on its inner face a resistance element adapted to contact the conductive element on the support member when the flexible member is deformed or forced against the former. Analogous modifications of the support member are also contemplated.

Turning now to the drawing, the modification of the measuring device illustrated in FIGURES 1, 2 and 3 will be described. The letter C designates a container for storing a pulverized or granular solid material M. Disposed in the container C is a measuring device of the type contemplated by this invention, indicated generally by the letter D.

The measuring device D consists of a support member 10 which, as shown, is preferably of a length substantially equivalent to the height of the container C. This member should be made from an insulating or non-conductive material. The width of the support is relatively narrow as compared to its length in order that the device will not occupy an undue amount of space in the container.

Secured to the face of support member 10 is a conductive element 11 extending substantially the full length of the support member. This element is preferably a copper strip but may be composed of any suitable, readily conductive material. A terminal 12 is connected to the element 11 and extends through the support member 10 to permit an external connection to a source of power and a measuring instrument or gauge 14, which may be a microammeter.

Covering the surface of the support member containing conductive element 11 is a flexible member 15. As shown, flexible member 15 is united to support member 10 around its entire periphery whereby an airtight pocket or chamber A is formed. Flexible member 15 is preferably made from a rubber or plastic composition which will withstand repeated flexing without deterioration.

The rubber or plastic composition from which flexible member 15 is formed, on one embodiment, would include a conductive filler such as carbon to the extent that the flexible member is rendered conductive, permitting the flow of electrical current.

Flexible member 15 is also connected to a suitable terminal 16, a source of power and a meter 14. The union of the flexible member 15 with support member 10 and the length of conductive element 11 should be such that when the flexible member is disposed in its normal position away from the support member, there is no contact of the former with element 11 of the support member.

Extending into chamber A is a hose or tube 17 which is connected to a suitable source of air pressure, not shown. Such pressure may be of the order of a few ounces or sufficient to normally hold flexible member 15 away from contact with conductive element 11 secured to support member 10.

The measuring device may be movable and, accordingly, inserted and removed from a container, as may be necessary, to determine the depth and quantity of material held in one or more containers. Alternately, the measuring device may be permanently located within the container and anchored to the bottom of the container, for example, by bracket 19.

When in use, the modification described above will have the flexible member expanded outwardly over its entire length away from the support member 10 by reason of air under slight pressure being introduced into chamber A. Under such condition the flexible member will be out of contact with conductive element 11 and the gauge 14 will indicate a zero reading.

As the measuring device is lowered into a receptacle containing a granulated or finely divided solid material, the pressure of the material acting against the expanded flexible member 15 will force the latter toward the support member 10 and in contact with conductive element 11. The further the device is moved into the contents of the container the more contact will be obtained between flexible member 15 and conductive element 11. The amount of contact between the two will establish a proportional decreasing resistance and, hence, permit current to flow in the circuit containing the meter and source of power. Correspondingly, the indicator of meter 14 will be caused to move in accordance with the amount of current flow. The meter 14 is provided with suitable graduations indicating the height of the contents of the container and, accordingly, the volume of the contents.

Although not shown, the measuring device may be constructed so as to form an integral part of a container. In such a modification the back or support would comprise a specific part of the container side and the flexible member would be attached to the inside of the container. If the container were made of metal, installation of a separate conductive element might generally be eliminated, although the flexible covering could not be conductive. In such a case the covering would require a separate electrically resistive strip of its own, as described hereinbelow.

Several further alternate modifications are also contemplated, designed to achieve the same results. In FIGURE 4, for example, there is shown a modification having a support 20 and associated conductive element 21. The flexible member 22, while being formed of a rubber or plastic composition, would not be conductive by elimination of the conductive filler incorporated into the composition. Rather, flexible member 22 would have attached to its inner face or surface a thin strip 23 of electrically resistive material, such as a carbon filled rubber foil or the like. This strip would be secured to flexible member 22 so as to be in general alignment with conductive element 21. The embodiment of FIGURE 4 would be used in the same manner as the previous embodiment described above; however, the circuit would be completed by contact between conductive element 21 and conductive strip 23. Actually, this type of modification, wherein a separate conductive strip is employed with the flexible member, will permit the support to be made of a conductive material if desired, and eliminate the need for an insulating support and associated but separate conductive element.

FIGURE 5 demonstrates a further modification which does not involve the use of air pressure to normally keep the flexible member expanded and away from the support member. In this modification the numeral 31 designates the support member provided with a conductive element 32. A flexible member 33 extends across and covers the support member 31 and has attached to its inner face an electrically resistive strip 34. The free portion of flexible member 33 is held outwardly from support member 31 by a pair of thin, flat steel springs 36 disposed on either side of flexible member 33 and extending the length of the measuring device. The springs are supported by element 35 interposed along the lateral edges of the device between the flexible member and the support.

The modification of the measuring device described immediately above eliminates the need for air pressure to hold the flexible member away from the support. Rather, this function, as indicated, is performed by the springs 36. When the measuring device is inserted into a container, the weight or pressure of the container contents overcomes the effect of the springs, thereby forcing contact between elements 21 and 23 and, correspondingly, permitting flow of current and actuation of the meter indicator.

It will be understood that various modifications may be made without departing from the spirit of the invention which is only intended to be limited by the scope of the following claims.

I claim:
1. A measuring device for finely divided solid material, said device comprising a conductive element forming a part of a support extending substantially the height of said container, a flexible covering for said conductive element and secured to the wall, said flexible covering containing a carbon filler as a resistive means for conducting an electrical current, and means for normally maintaining said flexible covering in spaced relationship with respect to said conductive element.

2. A measuring device for finely divided solid material, said device comprising a conductive element forming a part of a support extending substantially the height of said device, a flexible covering for said conductive element, said flexible covering containing a resistive means for conducting an electrical current, said support and flexible covering forming an airtight envelope, and means for introducing an air pressure into the envelope for normally maintaining said flexible covering in spaced relationship with respect to said conductive element.

References Cited
UNITED STATES PATENTS
| | | | |
|---|---|---|---|
| 2,713,793 | 6/1955 | Anderson | 73—301 |
| 3,153,342 | 10/1964 | Pierce | 73—301 |

FOREIGN PATENTS
| | | |
|---|---|---|
| 716,958 | 10/1954 | Great Britain. |

LOUIS R. PRINCE, *Primary Examiner.*

S. C. SWISHER, *Assistant Examiner.*